United States Patent
Pantpratinidhi et al.

(10) Patent No.: US 11,983,802 B2
(45) Date of Patent: May 14, 2024

(54) SYSTEMS AND METHODS FOR ANNOTATING A SCENE TO INCLUDE DIGITAL OBJECTS

(71) Applicant: Verizon Patent and Licensing Inc., Basking Ridge, NJ (US)

(72) Inventors: Nikhil Sadashiv Pantpratinidhi, El Dorado Hills, CA (US); Gang Lin, Cumming, GA (US); Vinaya Kumar Polavarapu, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 42 days.

(21) Appl. No.: 17/863,892

(22) Filed: Jul. 13, 2022

(65) Prior Publication Data

US 2024/0020892 A1 Jan. 18, 2024

(51) Int. Cl.
*G06T 11/20* (2006.01)
*G06F 3/01* (2006.01)
*G06T 7/50* (2017.01)
*G06V 40/20* (2022.01)
*H04N 23/60* (2023.01)

(52) U.S. Cl.
CPC ............ *G06T 11/203* (2013.01); *G06F 3/017* (2013.01); *G06T 7/50* (2017.01); *G06V 40/28* (2022.01); *H04N 23/64* (2023.01); *G06T 2207/20092* (2013.01); *G06T 2207/30196* (2013.01)

(58) Field of Classification Search
CPC ............ G06T 11/203; G06T 7/50; G06T 2207/20092; G06T 2207/30196; G06F 3/017; G06V 40/28; H04N 23/64
See application file for complete search history.

(56) References Cited

U.S. PATENT DOCUMENTS

| | | | |
|---|---|---|---|
| 10,341,568 B2 * | 7/2019 | Fischler | G06T 7/55 |
| 2017/0068416 A1 * | 3/2017 | Li | G06F 3/017 |
| 2022/0165005 A1 * | 5/2022 | Johnston | G06F 30/15 |
| 2023/0083703 A1 * | 3/2023 | Meiners | G06T 17/10 |
| | | | 382/154 |
| 2023/0196697 A1 * | 6/2023 | Fishman | G06F 3/011 |
| | | | 345/633 |

* cited by examiner

*Primary Examiner* — Grant Sitta

(57) ABSTRACT

An exemplary method includes a scene annotation system accessing image scan information of a scene captured by an imaging device of a computing device, generating, based on the image scan information, depth data associated with one or more objects in the scene, providing a two-dimensional (2D) annotation grid for concurrent display together with an image of the scene, at least part of the 2D annotation grid mapped to the depth data, receiving a user input (e.g., via hand gesture, touch screen, mouse, and/or keyboard) that selects a portion of the 2D annotation grid and a corresponding position within the scene where a digital object will be anchored based on the depth data, and instructing the computing device to display, by way of a display device of the computing device and based on the user input, the digital object anchored at the corresponding position within the scene.

20 Claims, 14 Drawing Sheets

SYSTEMS AND METHODS FOR ANNOTATING A SCENE TO INCLUDE DIGITAL OBJECTS

BACKGROUND INFORMATION

As computer technology has advanced, augmented reality (AR), virtual reality (VR), and mixed reality (XR) technologies are increasingly being implemented in everyday scenarios. For example, such technologies may be used to create immersive AR environments that engage workers (e.g., healthcare workers, manufacturing workers, construction workers, etc.) with their everyday jobs to increase productivity and enhance knowledge and skill sets of the workers. However, there remains room for improvement in implementing such technologies.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EXAMPLE EMBODIMENTS

Systems and methods for annotating a scene to include digital objects are described herein. In certain examples, for instance, an exemplary system may include a memory that stores instructions and a processor communicatively coupled to the memory and configured to execute the instructions to access image scan information of a scene captured by an imaging device of a computing device, generate, based on the image scan information, depth data associated with one or more objects in the scene, provide a two-dimensional (2D) annotation grid for concurrent display together with an image of the scene, at least part of the 2D annotation grid mapped to the depth data, receive a user input that selects a portion of the 2D annotation grid and a corresponding position within the scene where a digital object will be anchored based on the depth data, and instruct the computing device to display, by way of a display device of the computing device and based on the user input, the digital object anchored at the corresponding position within the scene to guide a user of the computing device in performing an operation with respect to the scene.

Various advantages and benefits are associated with the systems and methods for annotating a scene to include digital objects described herein. For example, systems and methods such as those described herein may facilitate a user of a computing device (e.g., smart glasses, a smartphone, etc.) perceiving digital objects as being anchored within a scene to provide guidance and/or instruction to the user while the user interacts with the scene. In certain examples, such guidance and/or instruction provided by way of digital objects anchored within a scene may enhance productivity, provide remote worker assistance/training, and/or increase knowledge of a remote worker that uses a computing device to interact with a scene. These and other benefits that may be provided by systems and methods described herein will be evident from the disclosure that follows.

Figure 1:
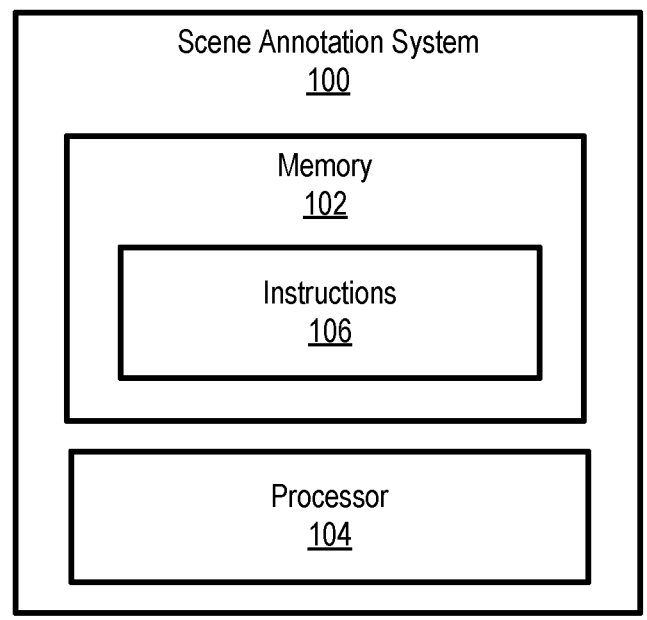
FIG. 1 illustrates an exemplary scene annotation system according to principles described herein.

FIG. 1 illustrates an exemplary scene annotation system 100 ("system 100") that may be implemented according to principles described herein. As shown, system 100 may include, without limitation, a memory 102 and a processor 104 selectively and communicatively coupled to one another. Memory 102 and processor 104 may each include or be implemented by hardware and/or software components (e.g., processors, memories, communication interfaces, instructions stored in memory for execution by the processors, etc.). In some examples, memory 102 and/or processor 104 may be implemented by any suitable computing device. In other examples, memory 102 and/or processor 104 may be distributed between multiple devices and/or multiple locations as may serve a particular implementation. Illustrative implementations of system 100 are described herein.

Memory 102 may maintain (e.g., store) executable data used by processor 104 to perform any of the operations described herein. For example, memory 102 may store instructions 106 that may be executed by processor 104 to perform any of the operations described herein. Instructions 106 may be implemented by any suitable application, software, code, and/or other executable data instance.

Memory 102 may also maintain any data received, generated, managed, used, and/or transmitted by processor 104. Memory 102 may store any other suitable data as may serve a particular implementation. For example, memory 102 may store data associated with digital objects, 2D annotation grids, hand tracking data (e.g., pre-defined hand gestures, hand landmark information, etc.), image scan information (e.g., pixel parallax data), depth data, notifications, instructions, graphical user interface content, and/or any other suitable data.

Processor 104 may be configured to perform (e.g., execute instructions 106 stored in memory 102 to perform) various processing operations associated with annotating a scene to include a digital object. For example, processor 104 may perform one or more operations described herein to implement a 2D annotation grid configured to facilitate a user of a computing device selecting positions where one or more digital objects will be anchored such that they appear to be located within a scene. These and other operations that may be performed by processor 104 are described herein.

Figure 2:
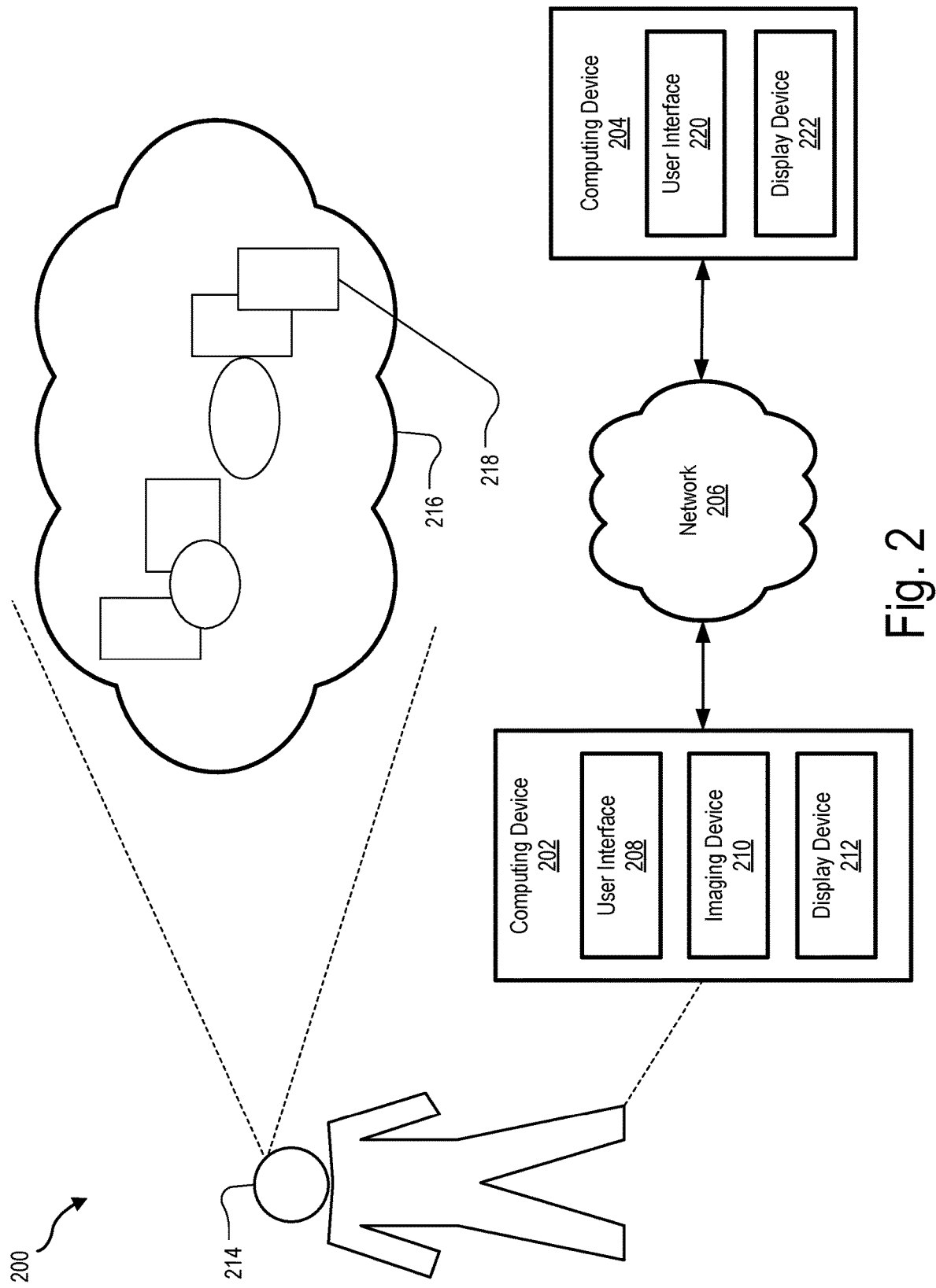
FIG. 2 illustrates an exemplary implementation of the scene annotation system of FIG. 1 according to principles described herein.

System 100 may be implemented in any suitable manner. FIG. 2 shows an exemplary implementation 200 in which system 100 may be provided in certain examples. As shown in FIG. 2, implementation 200 includes a computing device 202 that is communicatively coupled to a computing device 204 by way of a network 206. Computing device 202 includes a user interface 208, an imaging device 210, and a display device 212. Computing device 202 may include or be implemented by any suitable type of computing device or combination of computing devices as may serve a particular implementation. For example, computing device 202 may be implemented by smart glasses, a smartphone, a tablet computer, a head mounted display device, a VR device, an AR device, and/or any other suitable device through which a user 214 may view or otherwise experience a scene 216 including objects 218.

User interface 208 may correspond to any suitable type of user interface as may serve a particular implementation. For example, user interface 208 may correspond to a graphical user interface, a web interface (e.g., displayed by a display screen of a tablet computer), a touch screen interface, a touchless hand gesture interface, a holographic display interface, a VR interface, an AR interface, etc.

Imaging device 210 may correspond to any suitable type of imaging device that may be configured to capture imagery of a scene. For example, imaging device 210 may include a camera or other type of image capture device that may be configured to capture imagery of a scene. As used herein, "imagery" may include any suitable type of image or images as may serve a particular implementation. For example, imagery may include a single image (e.g., a still image), a moving image (e.g., a plurality of sequential image frames such as a video), and/or any other suitable type of image.

Display device 212 may correspond to any suitable type of display device that may be configured to facilitate user 214 interacting with scene 216. For example, display device 212 may correspond to a display portion of see-through type smart glasses that projects an image (e.g., a virtual image) to a field of view of a user while the user sees an external real-world environment, a display screen of a tablet computer, a display screen of a smartphone, or any other suitable type of display device.

Computing device 204 may correspond to any suitable type of computing device or system that may facilitate performing any of the operations described herein. For example, computing device 204 may correspond to a laptop computer, a tablet computer, a smartphone, a desktop computer, a server computing device, a cloud computing device, and/or any other suitable type of computing device that may be located remotely from computing device 202. Although only one computing device 204 is shown in FIG. 2, it is understood that in certain examples multiple additional computing devices similar to computing device 204 may also be operated by different users to facilitate the different users collaboratively annotating a scene to include one or more digital objects.

As shown in FIG. 2, computing device 204 includes a user interface 220 and a display device 222. User interface 220 may include any suitable type of user interface such as described herein. Display device 222 may include any suitable type of display device such as described herein.

System 100 may be implemented by computing device 202 or computing device 204. Alternatively, system 100 may be distributed across computing device 202 and computing device 204, or distributed across computing device 202, computing device 204, and/or any other suitable computing system/device.

As shown in FIG. 2, computing device 202 is communicatively connected to computing device 204 by way of network 206. Network 206 may include, but is not limited to, one or more wireless networks (Wi-Fi networks), wireless communication networks, mobile telephone networks (e.g., cellular telephone networks, 5G networks, etc.), mobile phone data networks, broadband networks, narrowband networks, the Internet, local area networks, wide area networks, and any other networks capable of carrying data and/or communications signals between computing device 202 and computing device 204. Communications between computing device 202, computing device 204, and any other device or system may be transported using any one of the above-listed networks, or any combination or sub-combination of the above-listed networks.

As shown in FIG. 2, computing device 202 is operated by user 214 to facilitate user 214 interacting with scene 216. In the example shown in FIG. 2, scene 216 includes objects 218 that user 214 may interact with while viewing scene 216 by way of computing device 202. Scene 216 may correspond to any suitable type of scene that user 214 may interact with while using computing device 202. For example, scene 216 may correspond to a real-world scene, a virtual scene, or any other suitable type of scene. In certain examples, scene 216 may correspond to a remote workplace scene in a workplace environment where user 214 may perform an operation or task in relation to one or more objects located within the remote workplace scene.

As will be described further herein, system 100 may be configured to perform one or more operations associated with facilitating one or more users annotating a scene to include one or more digital objects. As used herein, a "digital object" may refer to any type of object that may be virtually represented within a scene such as scene 216. For example, a digital object may include a 2D digital object, a 3D digital object, a VR digital object, an AR digital object, a video, a text-based digital object (e.g., that provides instructions, comments, etc. with respect to a scene), an audio digital object, a link digital object (e.g., a digital object that is selectable by a user to access further content/information associated with a scene), and/or any other suitable type of digital object. In certain examples, a digital object may be a predefined digital object that is selectable by a user for display within a scene. For example, a digital object may have a predefined shape, a predefined color, a predefined orientation, and/or any other suitable predefined attribute. In certain alternative examples, a digital object may be a user defined digital object. For example, a user may draw a digital object (e.g., geometric shapes or symbols by way of a touch input or a hand gesture tracking input) that may be provided for display within a scene. Exemplary digital objects are described further herein.

To facilitate system 100 providing a digital object for display within a scene, system 100 may access image scan information associated with a scene. This may be accomplished in any suitable manner. For example, system 100 may receive, from computing device 202, image scan information captured by imaging device 210 of computing device 202.

As used herein, "image scan information" may include any suitable information that may be captured by an imaging device in relation to a scene and that may be used to generate depth data. For example, imaging device 210 may correspond to a camera configured to capture image scan information in the form of RGB image frames of a scene. In certain alternative examples, imaging device 210 may further include a depth camera configured to capture image scan information in the form of a depth image of a scene.

Image scan information may be captured in any suitable manner. For example, system 100 may direct user 214 to move imaging device 210 of computing device 202 in a predefined direction in relation to scene 216 to capture the image scan information. This may be accomplished in any suitable manner. For example, system 100 may provide a text notification by way of display device 212 that instructs user 214 to slowly move imaging device 210 in relation to scene 216. The predefined direction may include any suitable direction in relation to scene 216 as may serve a particular implementation. For example, the predefined direction may correspond to a horizontal direction (e.g., from left to right) in relation to scene 216, a vertical direction (e.g., from a relatively lower position to a relatively higher position) in relation to scene 216, and/or any other suitable direction or combination of directions.

In certain examples, system 100 may direct user 214 of computing device 202 to move imaging device 210 in the predefined direction until a mean pixel parallax (or average pixel parallax) associated with the image scan information is above a predefined threshold. In certain examples, the mean pixel parallax may start at a value of 0 and may end around a value of 10,000. The predefined threshold may correspond to any suitable amount of parallax as may serve a particular implementation. For example, if the image scan is performed in 720p, the mean pixel parallax may correspond to a value in a rage from approximately 7,500 to 10,000. Achieving the predefined threshold may imply that there is sufficient parallax in the image scan information to facilitate determining depth data associated with scene 216. As such, system 100 may instruct user 214 to stop moving imaging device 210 of computing device 202 in the predefined direction after the predefined threshold is reached.

In certain examples, system 100 may use optical flow to track each image frame while a scan is performed to generate image scan information. For example, optical flow may be used to track a pattern of apparent motion of objects 218 within scene 216 between two or more consecutive image frames caused by movement of imaging device 210 while scanning scene 216.

Based on the image scan information, system 100 may generate depth data associated with objects 218 within scene 216. System 100 may generate the depth data in any suitable manner. For example, system 100 may perform a triangulation operation based on the image scan information to determine depth data associated with objects 218 within scene 216. In certain implementations, generating the depth data may include generating a point cloud for scene 216 based on the image scan information. The point cloud may be a three-dimensional structure that represents scene 216 in real-world coordinates. In such examples, system 100 may process the image scan information in any suitable manner and perform a triangulation operation to calculate the point cloud for scene 216.

To facilitate annotation of scene 216 with one or more digital objects, system 100 may generate a 2D annotation grid that is mapped to the depth data. Such a 2D annotation grid may correspond to a 2D image plane representation of 3D points in the real world. At least part of a 2D annotation grid may be mapped to the depth data determined based on the image scan information.

A 2D annotation grid may be configured in any suitable manner as may serve a particular implementation. For example, a 2D annotation grid may include a plurality of cells. At least some of the cells included in the plurality of cells may be mapped to the depth data determined based on the image scan information. For example, a first cell may be mapped to depth data determined at a first position within a scene, a second cell may be mapped to depth data determined at a second position within the scene, a third cell may be mapped to depth data determined at a third position within the scene, and so forth.

In certain examples, each cell included in the plurality of cells may correspond to a potential user selectable position of a digital object. In such examples, a digital object may be positioned with respect to any of the cells included in the plurality of the cells. In certain alternative examples, only a subset of the cells included in the plurality of cells may be suitable as a user selectable position of a digital object. For example, a first subset of cells included in the plurality of cells of a 2D annotation grid may be mapped to depth data and a second subset of cells included in the plurality of cells may not be mapped to the depth data. In such examples, the first subset of cells may be mapped to regions of scene 216 where there is sufficient depth data (e.g., there is a change in depth above a predefined threshold) to anchor a digital object. The second subset of cells may be associated with regions of scene 216 there may not be sufficient depth data (e.g., the change in depth is below the predefined threshold) to anchor a digital object. In view of this, the second subset of cells may not be mapped to the depth data. In such examples, the first subset of cells may correspond to annotatable regions of the 2D annotation grid whereas the second subset of cells may correspond to regions of the 2D annotation grid where it may not be possible or allowed to annotate (e.g., there is not sufficient depth data).

Figure 3:
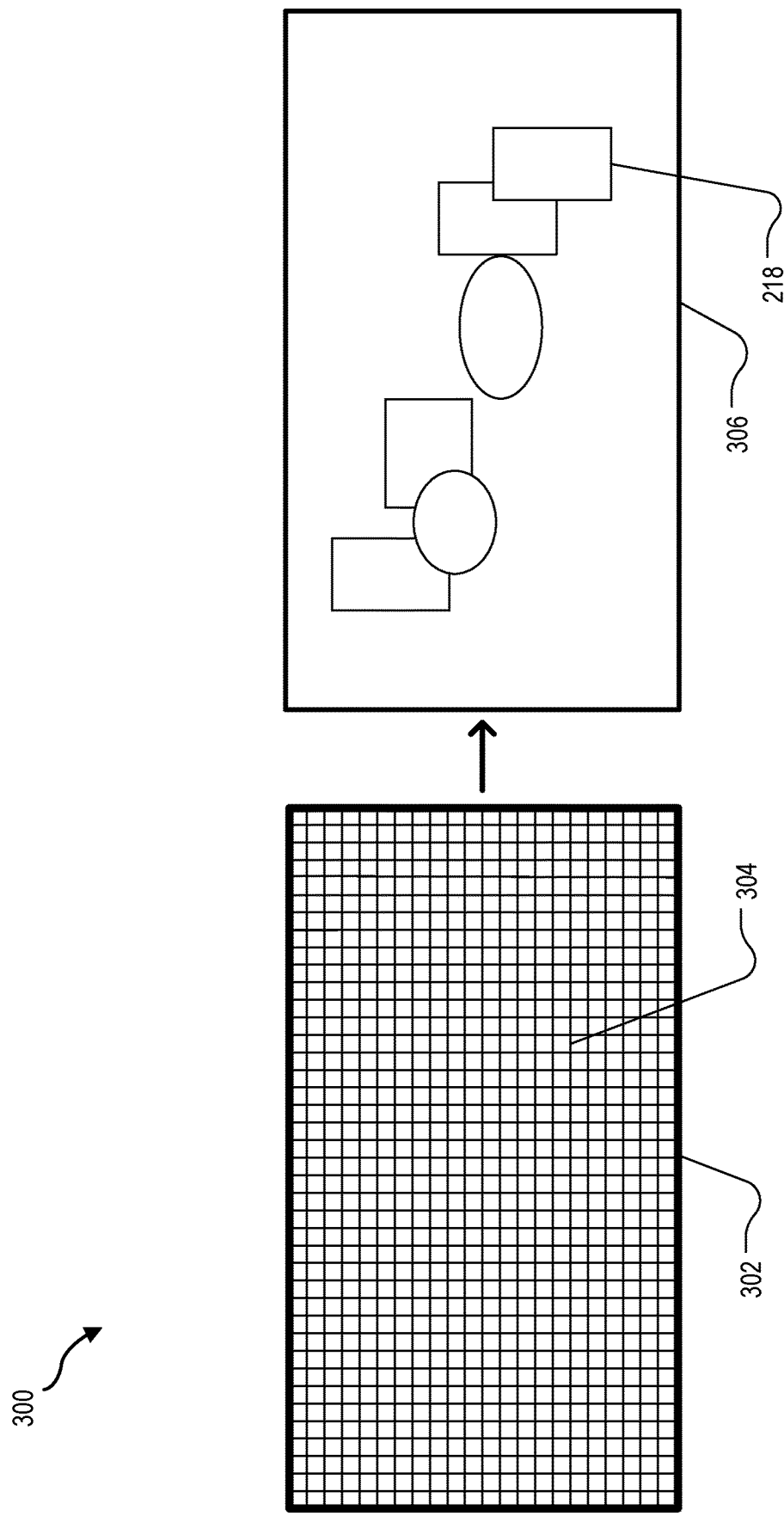
FIG. 3 illustrates an exemplary representation of a two-dimensional (2D) annotation grid and an exemplary image of a scene according to principles described herein.

Any suitable number and/or size of cells may be represented in a 2D annotation grid as may serve a particular implementation. To illustrate, FIG. 3 shows an exemplary configuration 300 that depicts a 2D annotation grid 302 that includes a plurality of cells 304. As shown in FIG. 3, 2D annotation grid 302 may be combined with respect to an image 306 of scene 216 to facilitate annotation of one or more objects 218 represented within scene 216. Image 306 may correspond to any suitable type of image of scene 216. For example, system 100 may access a video image (e.g., captured during a scan operation) of scene 216 and may select a frame of the video image to use as image 306. In such examples, image 306 may correspond to a still image that is selected by system 100 for use in annotating scene 216 with one or more digital objects. Using a still image in such examples is beneficial in that doing so allows a user to easily and accurately select positions for digital objects without being compromised by movement of objects and/or a change of the field of view in a video image. In certain alternative examples, image 306 may correspond to a stored video image or a live video image captured (e.g., in real time) by imaging device 210.

Figure 4:
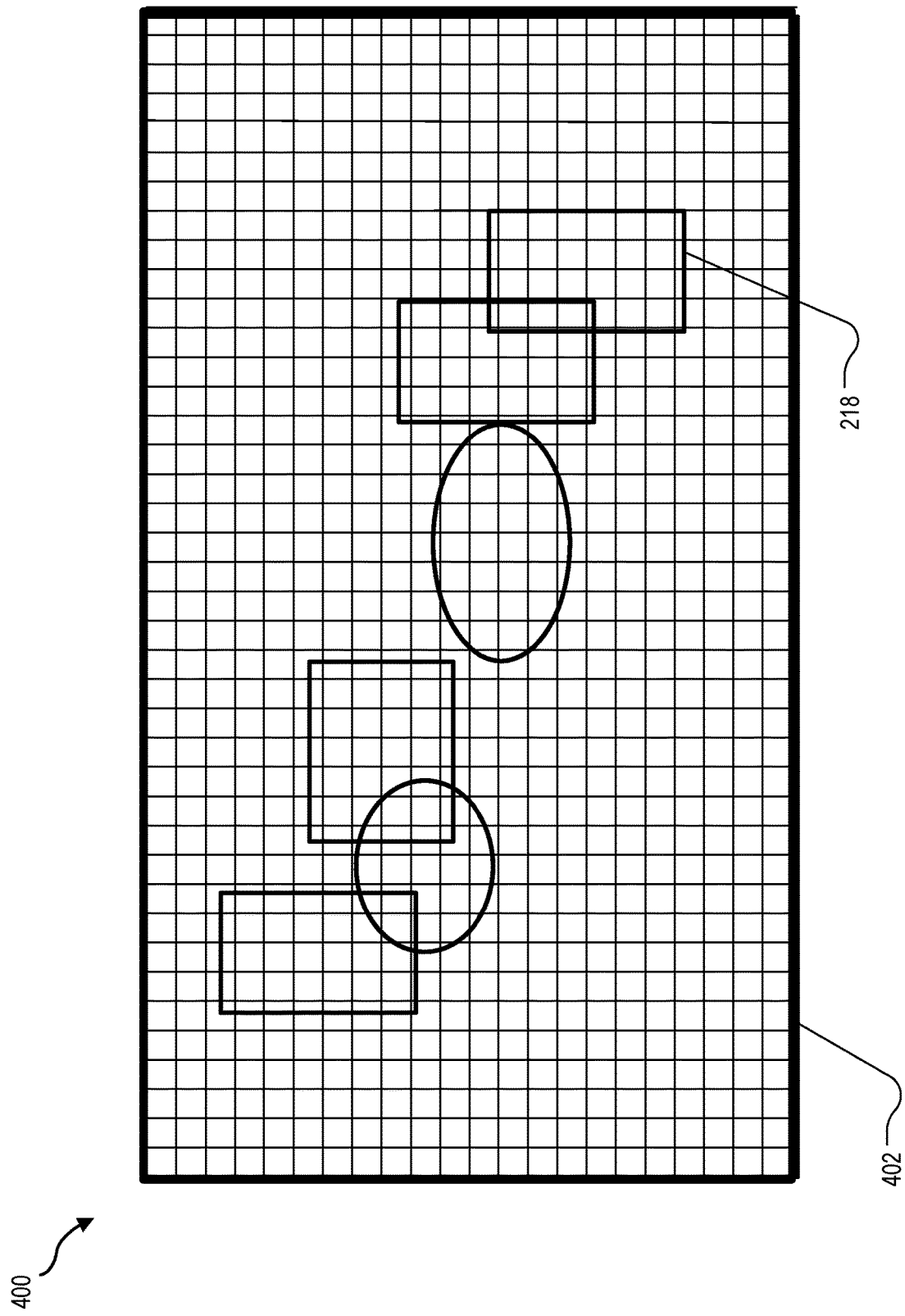
FIG. 4 illustrates an exemplary implementation depicting a combination of a 2D annotation grid and an image of a scene according to principles described herein.

To facilitate annotation of a scene, system 100 may provide a 2D annotation grid for concurrent display together with an image of a scene. This may be accomplished in any suitable manner. For example, system 100 may overlay a 2D annotation grid over an image of a scene such that the position of the depth data that is mapped to the 2D annotation grid is aligned with corresponding objects located in the image of the scene. FIG. 4 shows an exemplary implementation 400 where 2D annotation grid 302 is overlayed over image 306 to form a combined image 402. With such a configuration, the position of depth data mapped to 2D annotation grid 302 may be aligned with corresponding positions of objects 218 within image 306.

System 100 may provide a 2D annotation grid for concurrent display together with an image of a scene by way of any suitable display device of any suitable computing device or combination of computing devices as may serve a particular implementation. For example, in certain implementations, system 100 may provide a 2D annotation grid for concurrent display together with an image of scene 216 by way of display device 212 of computing device 204. In such examples, a user of computing device 204 may interact with the combination of the 2D annotation grid and the image of the scene to facilitate the user of computing device 204 designating positions of one or more digital objects to be displayed within scene 216 such that they appear to user 214 as being located within scene 216. In so doing, system 100 may facilitate the user of computing device 204 providing remote guidance to user 214 to guide user 214 in interacting with scene 216.

Additionally or alternatively, in certain implementations, system 100 may provide a 2D annotation grid for concurrent display together with an image of scene 216 by way of display device 212 of computing device 202. In such examples, user 214 may interact with the combination of the 2D annotation grid and the image of scene 216 in any suitable manner such as described herein to facilitate user 214 designating positions of one or more digital objects to be displayed within scene 216.

In certain examples, system 100 may provide a visual indicator within a 2D annotation grid that visually differentiates a first subset of cells that may be mapped to the depth data from a second subset of cells that may not be mapped to the depth data. Such a visual indicator may inform a user (e.g., a remote user or user 214) regarding which cells are mapped to sufficient depth data such that a digital object may be associated with them. Such a visual indicator may be represented within a user interface view in any suitable manner as may serve a particular implementation. For example, a visual indicator may include highlighting a border of certain cells in a different color than other cells, shading an inside of certain cells differently than other cells, providing dashed lines with respect to a border of certain cells and not other cells, and/or visually differentiating the cells in any other suitable manner.

Figure 5:
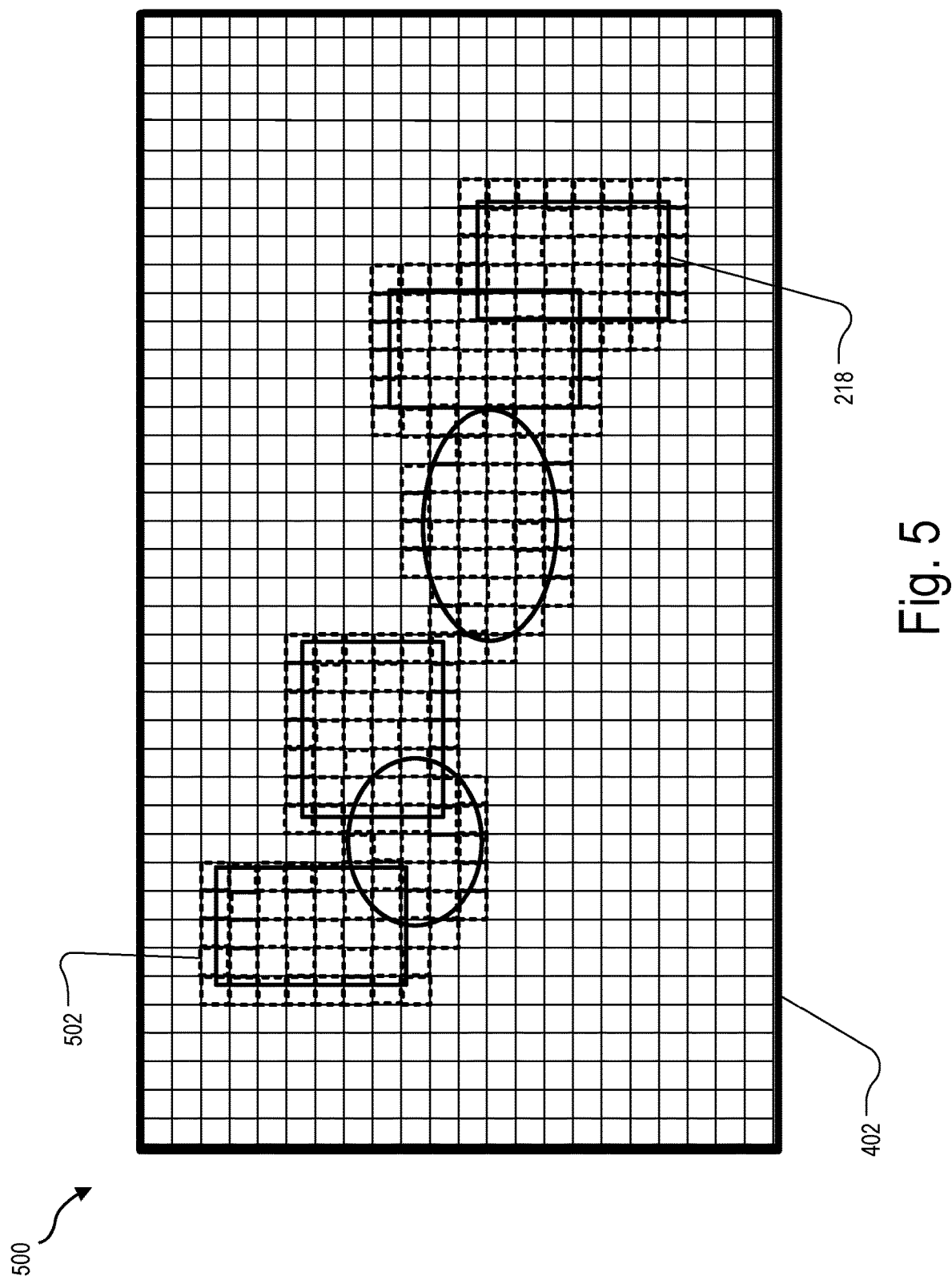
FIGS. 5-7 illustrate exemplary user interface views configured to facilitate annotating a scene according to principles described herein.

To illustrate, FIG. 5 shows an exemplary user interface view 500 where visual indicators 502 are provided for display within combined image 402. Visual indicators 502 may indicate locations or portions of objects 218 where there is sufficient depth data to anchor a digital object within scene 216. In the example shown in FIG. 5, visual indicators 502 are shown as dashed lines provided around the borders of certain cells within 2D annotation grid 302. However, visual indicators 502 may be represented in any other suitable manner such as described herein.

Figure 6:
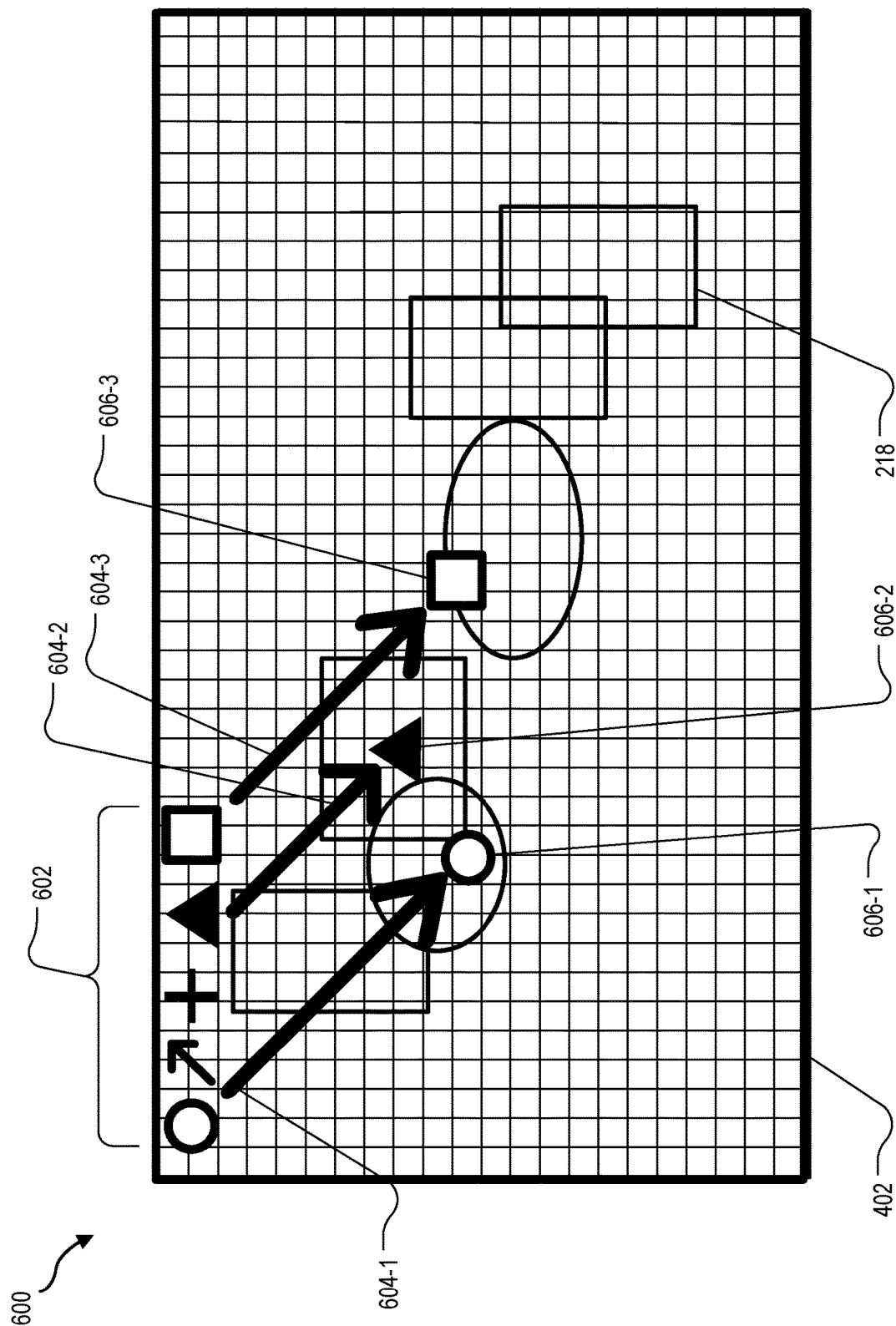

After system 100 provides a combined 2D annotation grid and image of a scene for display to a user, system 100 may receive or otherwise detect a user input that selects a position within the scene to anchor a digital object. The user input may correspond to any suitable type of user input that may be entered by way of any suitable user interface such as described herein. For example, the user input may correspond to a touch input provided by way of a display screen, a mouse cursor input, a hand gesture input, and/or any other suitable type of input. The user input may select a portion of the 2D annotation grid and a corresponding position within the scene where a digital object will be anchored based on the depth data. To illustrate, FIG. 6 shows an exemplary user interface view 600 that may be provided for display by system 100 to facilitate a user annotating scene 216. As shown in FIG. 6, user interface view 600 includes a menu 602 that includes a plurality of icons representative of digital objects that may be used to annotate scene 216.

A user interface such as user interface view 600 may be provide for display to any suitable user to facilitate annotation of scene 216. For example, user interface view 600 may be provided for display to user 214 and/or a user of computing device 204. In certain alternative examples, user interface view 600 may be provided for display to multiple different users (e.g., experts that may independently provide guidance or instruction) located remotely from scene 216. In such examples, user interface view 600 may facilitate the multiple different users remotely and collaboratively annotating scene 216 to provide, for example, live AR assistance to a user located at scene 216.

A user (e.g., user 214, a user of computing device 204, and/or other users) may select and move one or more of the icons into position, as shown in FIG. 6, to annotate scene 216. For example, the user may provide a first touch input to drag the circle icon in the direction of arrow 604-1 to designate a position of digital object 606-1 within scene 216, the user may provide a second touch input to drag the triangle icon in the direction of arrow 604-2 to designate a position of digital object 606-2 within scene 216, and the user may provide a third touch input to drag the square icon in the direction of arrow 604-3 to designate a position of digital object 606-3 within scene 216. The position of digital object 606-1 shown in FIG. 6 illustrates that digital object 606-1 is associated with one or more cells that are mapped to a specific depth position with respect to scene 216. The position of digital object 606-2 shown in FIG. 6 illustrates that digital object 606-2 is associated with one or more cells that are mapped to a specific depth position with respect to scene 216. The position of digital object 606-3 shown in FIG. 6 illustrates that digital object 606-3 is associated with one or more cells that are mapped to a specific depth position with respect to scene 216. The exemplary icons depicted within menu 602 are provided for illustrative purposes only. It is understood that any other suitable type of icon, shape, or object may be used to annotate a scene as may serve a particular implementation. For example, in addition to annotating by way of a drag and drop gesture, a user may provide any suitable type of user input to change a size (e.g., enlarge or shrink) and/or an orientation of pre-defined or fixed shapes such as those shown in menu 602.

In certain examples, system 100 may be configured to detect a user input by way of a hand gesture provided by a user (e.g., user 214 and/or a user of computing device 204). In such examples, system 100 may capture imagery of a hand of the user of the computing device. This may be accomplished in any suitable manner. For example, system 100 may capture imagery of the hand of the user in real time while the user moves his/her hand in relation to an image of scene 216. Based on the imagery of the hand of the user, system 100 may determine a hand gesture performed by the user. This may be accomplished in any suitable manner. For example, based on the captured imagery, system 100 may determine relative positions of one or more landmarks of a hand of the user. In such examples, system 100 may implement a deep learning module that detects a palm of the hand in any given image frame and extracts any suitable number of landmarks (e.g., 21 landmarks) associated with the palm, including the wrist, and the finger joints. Based on the relative positions of the landmarks, system 100 may determine whether the user has entered a predefined hand gesture input. System 100 may be configured to detect any suitable number or type of hand gesture user inputs as may serve a particular implementation.

In certain examples, system 100 may implement a deep learning method using multiple pre-trained models to facilitate tracking hand gestures in real time. For example, system 100 may use a pre-trained palm detection model and a pre-trained hand landmark model to facilitate tracking hand gestures in real time. In certain examples, system 100 may improve efficiency of hand tracking by running two processing threads in parallel. One processing thread may be used by system 100 to perform palm detection on a current image frame and another processing thread may be used by system 100 to perform hand landmark prediction on a previous image frame in which a palm region has already been detected by system 100.

Figure 7:
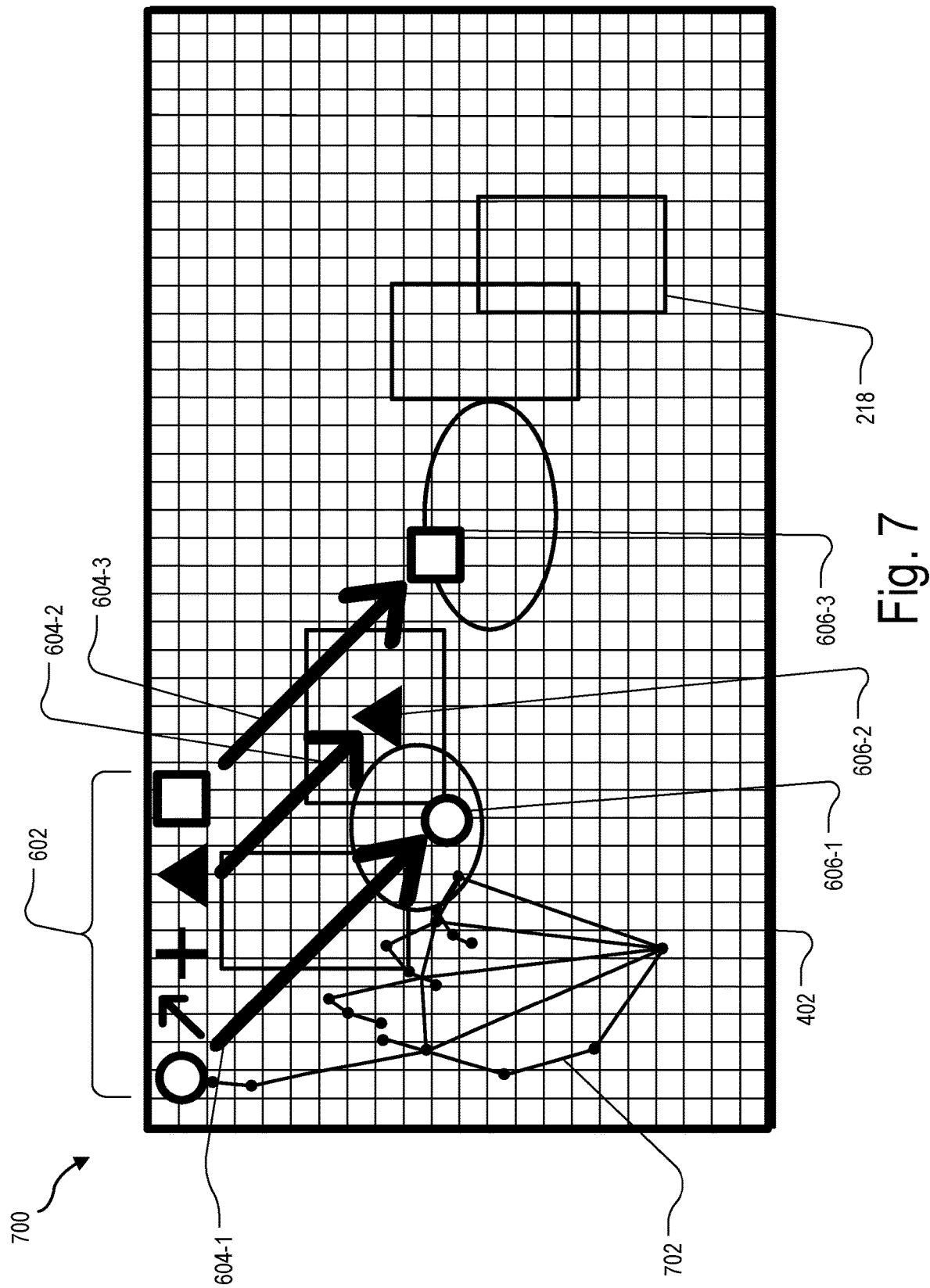

FIG. 7 shows an exemplary additional or alternative user interface view 700 that may be provided for display in certain implementations to facilitate a user using a hand gesture to annotate a scene to include a digital object. User interface view 700 is similar to user interface view 600 except that a wireframe representation 702 of a hand of a user is overlaid over combined image 402. Wireframe representation 702 may be configured to facilitate a user (e.g., user 214) providing hand gesture user inputs with respect to combined image 402. In the example shown in FIG. 7, wireframe representation 702 shows that an index finger is extended with the remaining fingers curled. Such a configuration may correspond to a drag digital object hand gesture that selects, for example, the circle icon and moves the circle icon to any suitable position with respect to objects 218. In certain examples, system 100 may detect an additional hand gesture user input to then place the circle icon at a user selected position. For example, as the user moves their hand, wireframe representation 702 may move in the direction of arrow 604-1. Once the circle icon reaches the position indicated by arrow 604-1, the user may extend the other fingers or perform any other suitable predefined hand gesture to cause digital object 606-1 to be positioned within combined image 402 as shown in FIG. 7.

Wireframe representation 702 is shown in FIG. 7 for illustrative purposes only. It is understood that system 100 may represent a hand of the user together with a combined image such as combined image 402 in any other suitable way as may serve a particular implementation. For example, system 100 may provide a semi-transparent representation of a hand of the user, a photorealistic representation of a hand of a user, a dashed-line representation of a hand of the user, and/or any other suitable representation as may serve a particular implementation.

In certain examples, system 100 may determine a pose of computing device 202 in relation to a scene to facilitate anchoring a digital object at a user selected position within the scene. This may be accomplished in any suitable manner. For example, system 100 may determine the six degrees of freedom (6-DOF) pose of computing device 202 in relation to scene 216. The 6-DOF pose may be determined based on the depth data (e.g., the point cloud) generated based on the image scan information and based on movement of computing device 202 in relation to scene 216. Such movement may be determined in any suitable manner using, for example, tracking some invariant features such as BRISK or optical flow detected in camera views, motion sensors and/or GPS positioning information provided by computing device 202. In certain examples, the 6-DOF pose of computing device may be estimated for each image frame captured by imaging device 210 of computing device 202.

Figure 8:
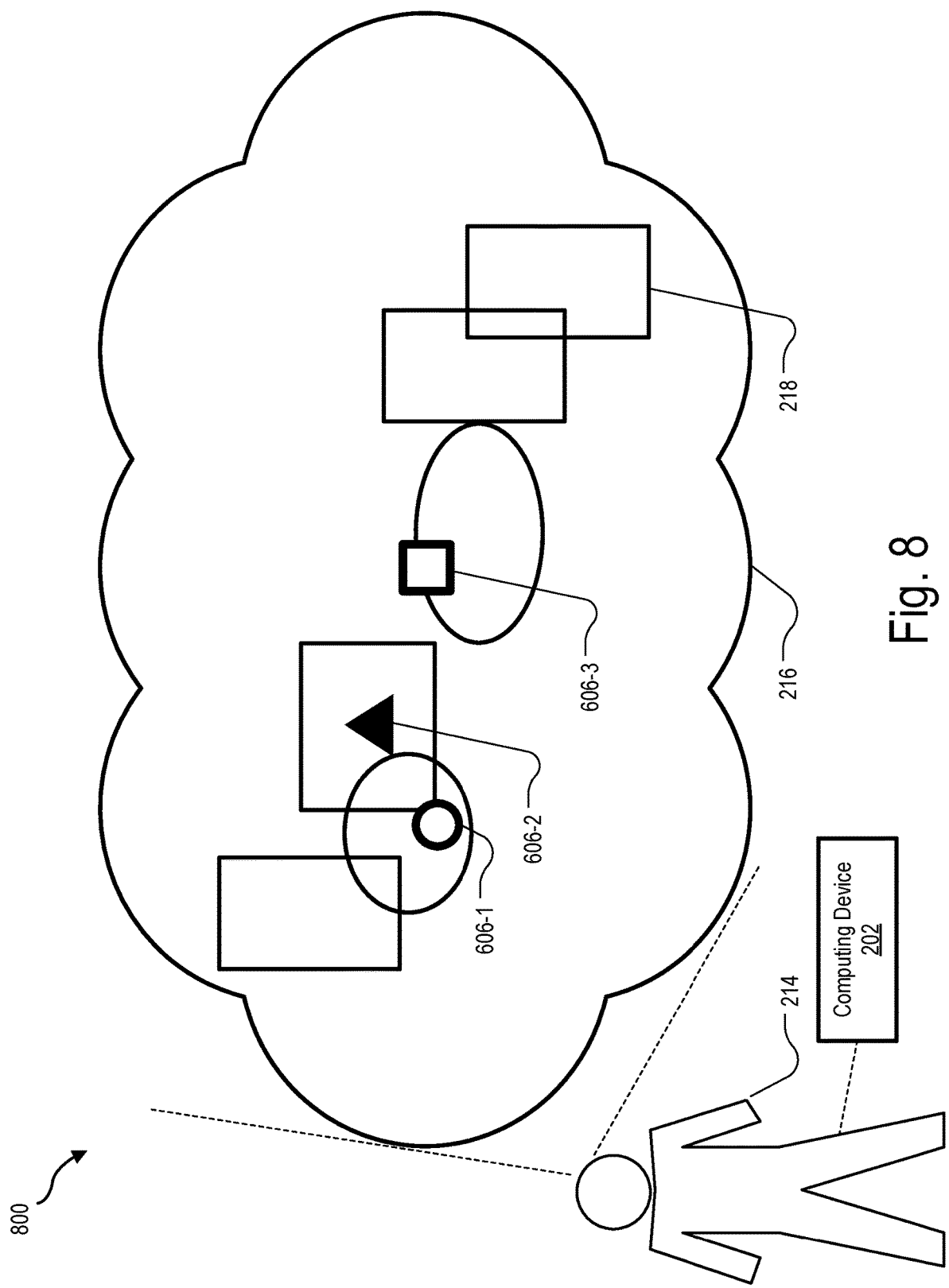
FIG. 8 illustrates exemplary digital objects that may be provided for display to a user so as to appear as being located at user selected positions within a three-dimensional (3D) scene according to principles described herein.

Based on the user input, system 100 may instruct a computing device to display a digital object anchored at a user selected position within the scene. As used herein, being "anchored" within a scene means that the digital objects such as digital objects 606 may appear to remain at the user selected position regardless of a change in view of a user and/or an imaging device of a computing device used by the user in relation to a scene. A computing device such as computing device 202 may display a digital object anchored within the scene in any suitable manner using any suitable information. For example, the 6-DOF pose of computing device 202 and the depth data associated with the user selected position within combined image 402 may be used by computing device 202 to determine where to project digital objects 606 to anchor them within scene 216. To illustrate, FIG. 8 shows an exemplary implementation 800 that depicts digital objects 606 anchored within scene 216 as if they are part of scene 216. If user 214 changes their field of view (e.g., by moving their head while wearing smart glasses) of scene 216 from that shown in FIG. 8 to a different field of view, digital objects 606 will still appear to user 214 as if they are located at the user selected positions.

System 100 may represent one or more digital objects at user selected positions within a scene in any suitable manner. For example, in implementations where computing device 202 corresponds to see through type smart glasses, digital objects 606 may be displayed by way of a display screen of the smart glasses to one or more eyes of user 214 such that the digital objects appear as if they are a part of scene 216, essentially rendering, for example, an AR or XR experience for user 214. In certain alternative implementations where computing device 202 corresponds to a smartphone or a tablet computer, user 214 may hold up the smartphone or tablet computer to scene 216 and view scene 216 and digital objects 606 by way of the display screen of the smartphone or tablet computer.

Figure 9:
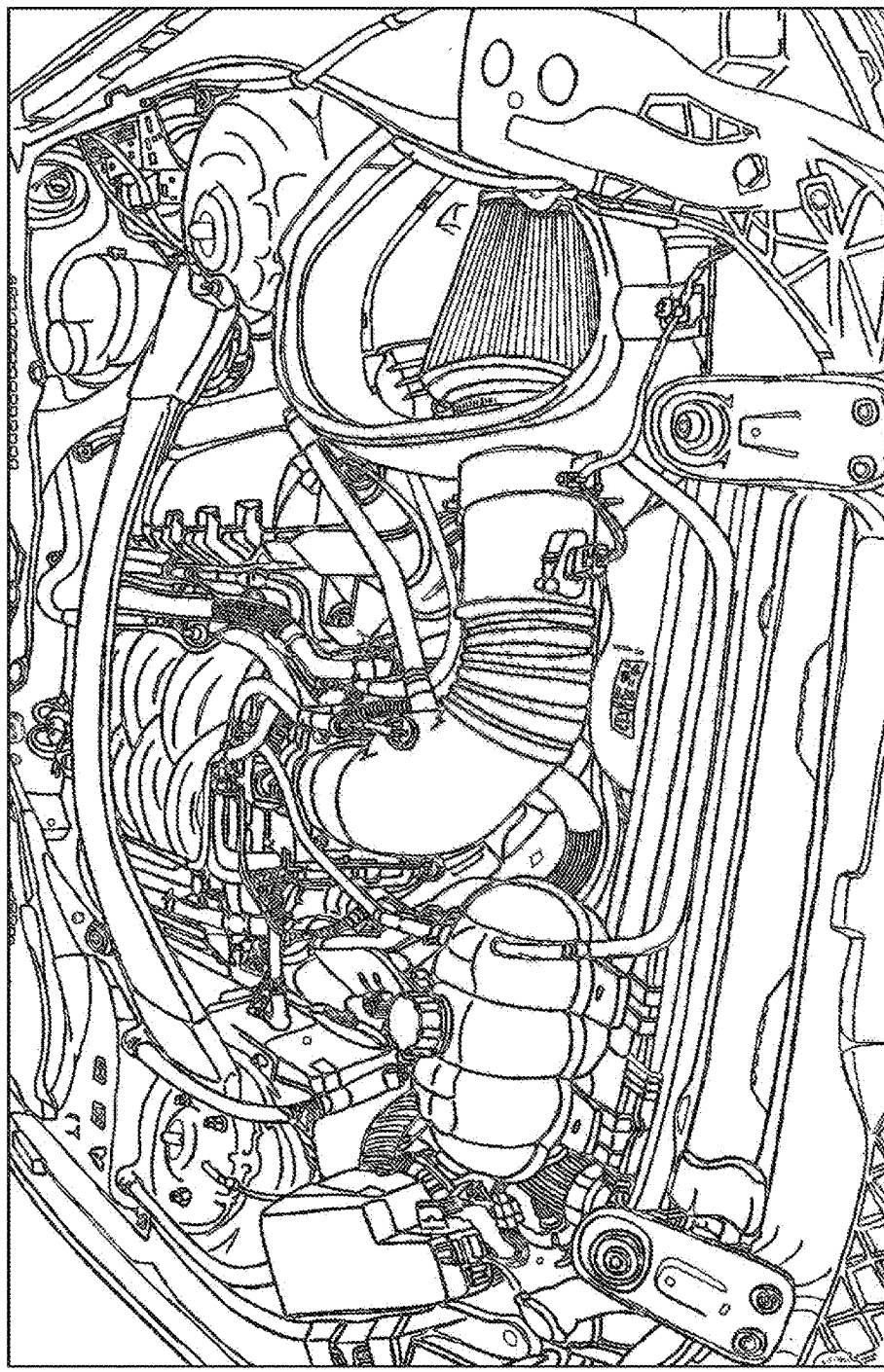
FIG. 9 illustrates an exemplary image scan operation that may be performed with respect to a scene to generate image scan information according to principles described herein.
Figure 10:
FIG. 10 illustrates another exemplary user interface view configured to facilitate annotating a scene according to principles described herein.
Figure 11:
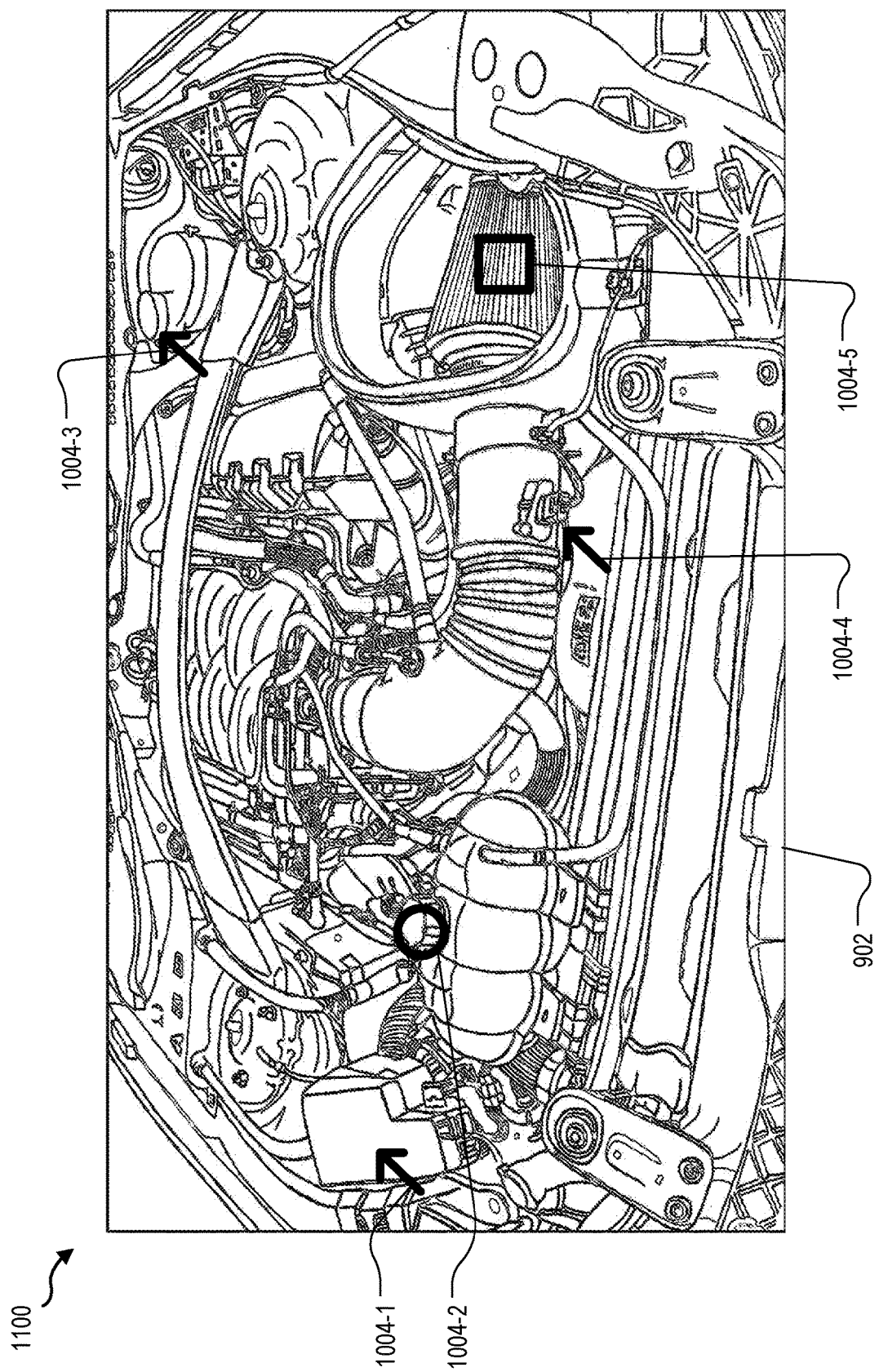
FIG. 11 illustrates exemplary digital objects provided for display to a user so as to appear as being located at user selected positions within a scene according to principles described herein.

FIGS. 9-11 illustrate an exemplary context in which principles such as those described herein may facilitate a user of computing device 202 receiving guidance in interacting with a scene. In the specific example shown in FIGS. 9-11, the guidance is associated with the user performing one or more operations with respect to an engine of a vehicle. As shown in FIG. 9, configuration 900 depicts the engine bay of a vehicle as corresponding to a scene 902 that user 214 may see in the real world while working on the vehicle. In such an example, computing device 202 may correspond to smart glasses worn by user 214 while user 214 works on the engine of the vehicle. Imaging device 210 may correspond to a camera of the smart glasses. While user 214 views scene 902 by way of the smart glasses, system 100 may provide a notification to user 214 directing user 214 to use the camera of the smart glasses to capture image scan information of the engine of the vehicle. For example, system 100 may provide a text notification for display, in any suitable manner, to user 214 that instructs user 214 to move the smart glasses from the left to the right in the direction of arrow 904 in relation to scene 902 to generate the image scan information. Based on the image scan information, system 100 may generate depth data associated with objects within scene 902 in any suitable manner such as described herein.

FIG. 10 shows an exemplary user interface view 1000 depicting a combined image 1002 that includes a 2D annotation grid overlayed over an image of scene 902. Combined image 1002 may be provided for display to one or more users by system 100 to facilitate the one or more users annotating scene 902. For example, user interface view 1000 may be provided for display by way of display device 222 to a user of computing device 204 that is located remotely from user 214. The user of computing device 204 may be an engine service expert that may interact with combined image 1002 to select positions of digital objects configured to guide user 214 in performing one or more operations with respect to the engine of the vehicle. For example, the user of computing device 204 may interact with user interface view 1000 to select the positions for digital objects 1004 (e.g., digital objects 1004-1 through 1004-5) within scene 902 as shown in FIG. 10. Such digital objects may guide user 214 in, for example, changing an air filter, checking/replacing engine fluids, and/or performing any other suitable operation with respect to the engine represented in scene 902. In examples where a user of computing device 204 annotates combined image 1002 with digital objects, the annotation process may be transparent to user 214 of computing device 202. That is, user 214 may not be presented with user interface view 1000. Rather, user 214 may just see digital objects 1004 at the user selected positions within scene 902 by way of, for example, the smart glasses worn by user 214.

Based on the selected positions of digital objects 1004 shown in FIG. system 100 may provide digital objects 1004 for display within scene 902. For example, FIG. 11 shows a representation 1100 of scene 902 that includes digital objects 1004 provided for display at the user selected positions within scene 902. In the example shown in FIG. 11, system 100 may instruct the smart glasses worn by user 214 to display digital objects 1004 to one or more eyes of user 214 such that the digital objects appear to be anchored at the user selected positions within scene 902. Because digital objects 1004 are anchored within scene 902, user 214 may move around and change their field of view seen through the smart glasses but digital objects 1004 will appear to remain at the same user selected position within scene 902.

In addition to providing an indication of a location of specific parts of the engine represented in scene 902, one or more of digital objects 1004 may be selectable by user 214 to provide user 214 with further information regarding the specific parts. For example, digital object 1004-3 may indicate the location of the brake fluid reservoir and may also correspond to a user selectable link that may be selected in any suitable manner by user 214 to access further information regarding adding to/replacing brake fluid used by the vehicle.

Figure 12:
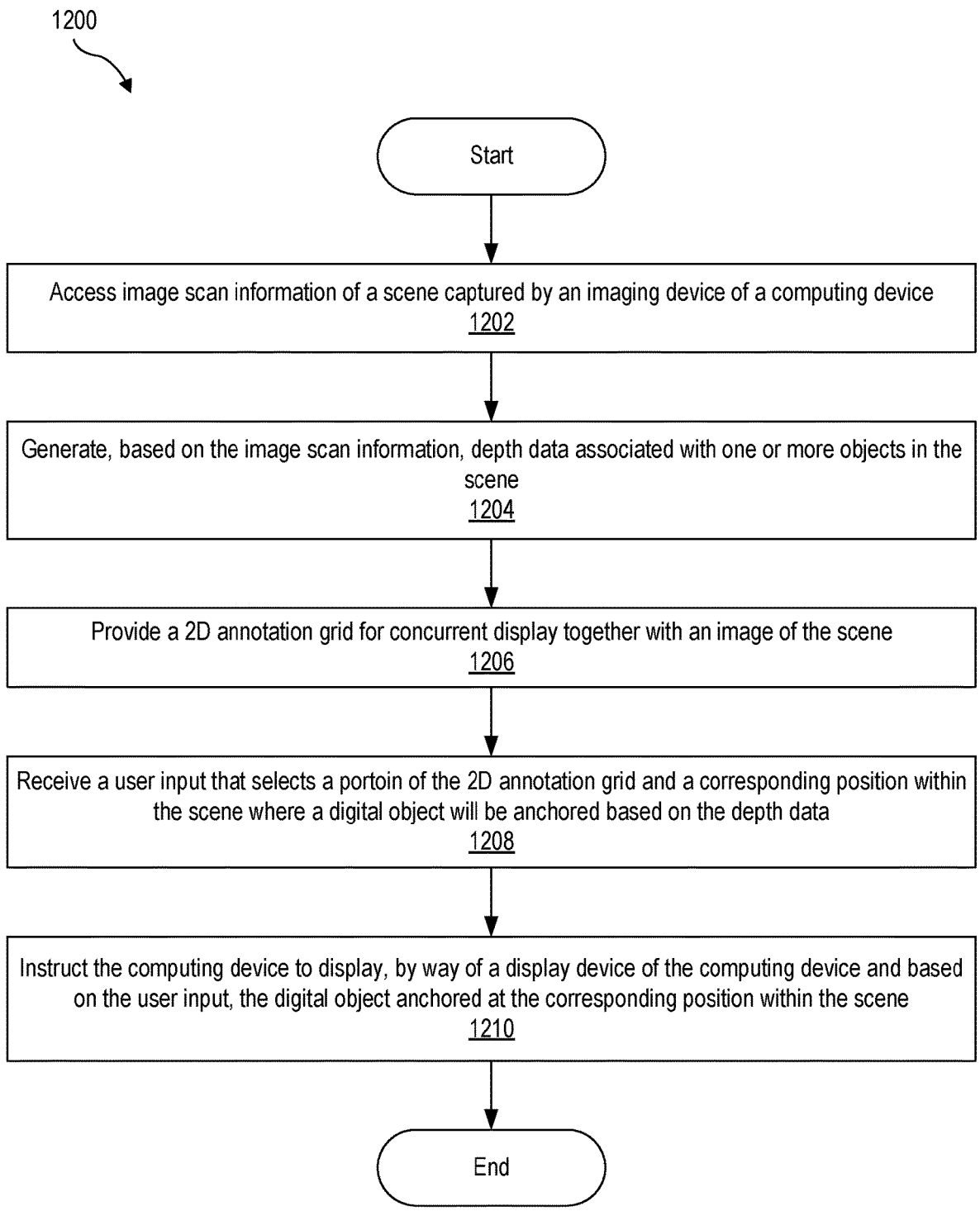
FIGS. 12-13 illustrate exemplary methods for annotating a scene to include a digital object according to principles described herein.

FIG. 12 illustrates an exemplary method 1200 for annotating a scene to include digital objects. While FIG. 12 illustrates exemplary operations according to one embodiment, other embodiments may add to and/or modify the operations shown in FIG. 12. The operations shown in FIG. 12 may be performed by system 100, any components included therein, and/or any implementation thereof.

At operation 1202, a system (e.g., scene annotation system 100) may access image scan information of a scene captured by an imaging device of a computing device. Operation 1202 may be performed in any of the ways described herein.

At operation 1204, the system may generate, based on the image scan information, depth data associated with one or more objects within the scene. Operation 1204 may be performed in any of the ways described herein.

At operation 1206, the system may provide a 2D annotation grid for concurrent display together with an image of the scene, at least part of the 2D annotation grid mapped to the depth data. Operation 1206 may be performed in any of the ways described herein.

At operation 1208, the system may receive a user input that selects a portion of the 2D annotation grid and a corresponding position within the scene where a digital object will be anchored based on the depth data. As described herein, the user input may be provided by a user that is experiencing the scene and/or by one or more other users that may be located remotely from the scene. Operation 1208 may be performed in any of the ways described herein.

At operation 1210, the system may instruct the computing device to display, by way of a display device of the computing device and based on the user input, the digital object anchored at the corresponding position within the scene. Operation 1210 may be performed in any of the ways described herein.

Figure 13:
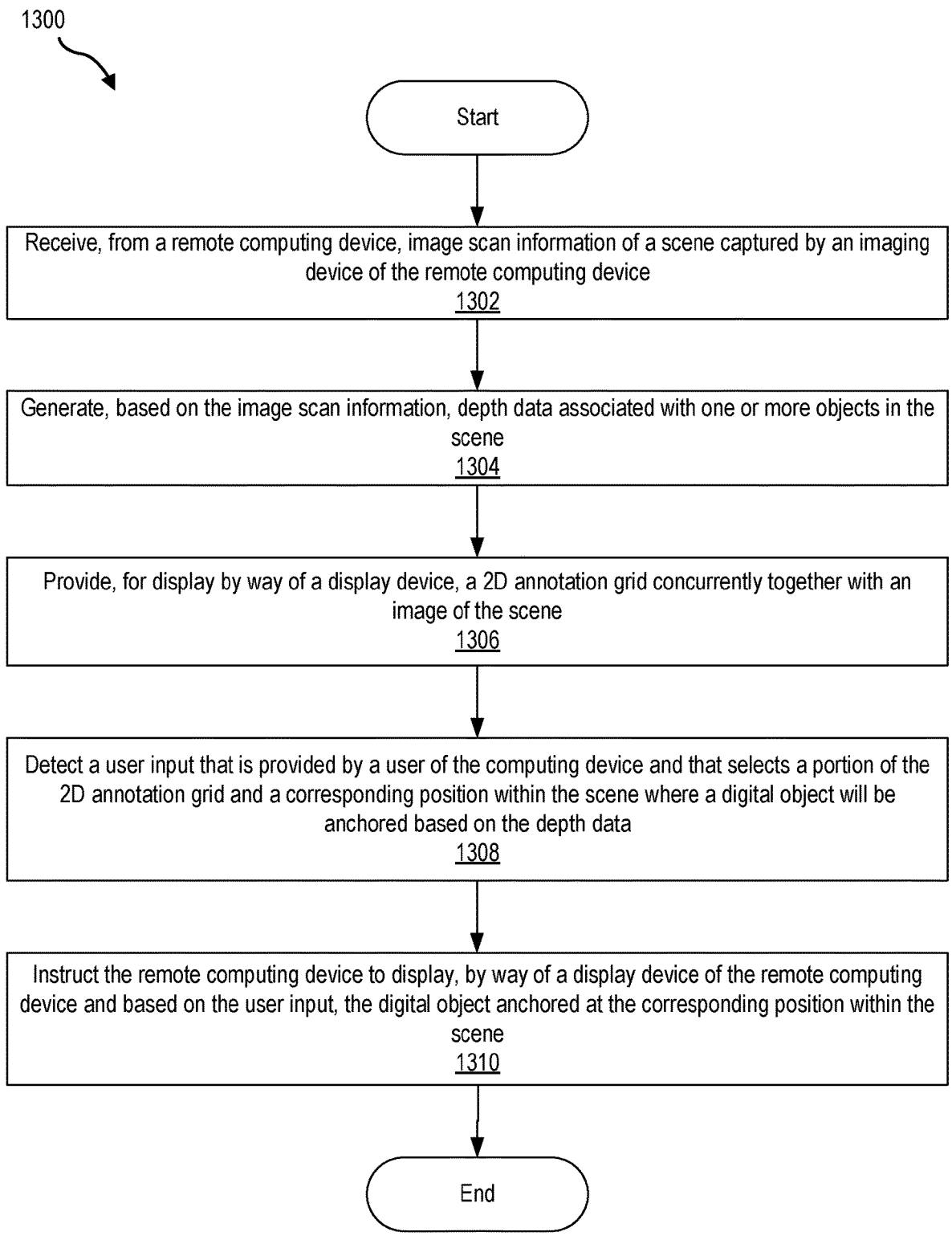

FIG. 13 illustrates an additional exemplary method 1300 for annotating a scene to include digital objects. While FIG. 13 illustrates exemplary operations according to one embodiment, other embodiments may add to and/or modify the operations shown in FIG. 13. The operations shown in FIG. 13 may be performed by system 100, any components included therein, and/or any implementation thereof.

At operation 1302, a system (e.g., scene annotation system 100) may receive, from a remote computing device, image scan information of a scene captured by an imaging device of the remote computing device. Operation 1302 may be performed in any of the ways described herein.

At operation 1304, the system may generate, based on the image scan information, depth data associated with one or more objects in the scene. Operation 1304 may be performed in any of the ways described herein.

At operation 1306, the system may provide, for display by way of the display device, a two-dimensional (2D) annotation grid concurrently together with an image of the scene. At least part of the 2D annotation grid may be mapped to the depth data. Operation 1306 may be performed in any of the ways described herein.

At operation 1308, the system may detect a user input that is provided by a user of the computing device and that selects a portion of the 2D annotation grid and a corresponding position within the scene where a digital object will be anchored based on the depth data. Operation 1308 may be performed in any of the ways described herein.

At operation 1310, the system may instruct the remote computing device to display, by way of a display device of the remote computing device and based on the user input, the digital object anchored at the corresponding position within the scene. In certain examples, the digital object may be configured to guide a user of the remote computing device in interacting with respect to the scene. For example, the digital object may guide the user of the remote computing device with information, notifications, icons, user generated drawings, and/or any other suitable type of digital object anchored within the scene to facilitate the user performing an operation or a task with respect to the scene. Operation 1310 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory (RAM), and an optical disc (e.g., a compact disc, a digital video disc, a Blu-ray disc, etc.). Exemplary volatile storage media include, but are not limited to, RAM (e.g., dynamic RAM).

Figure 14:
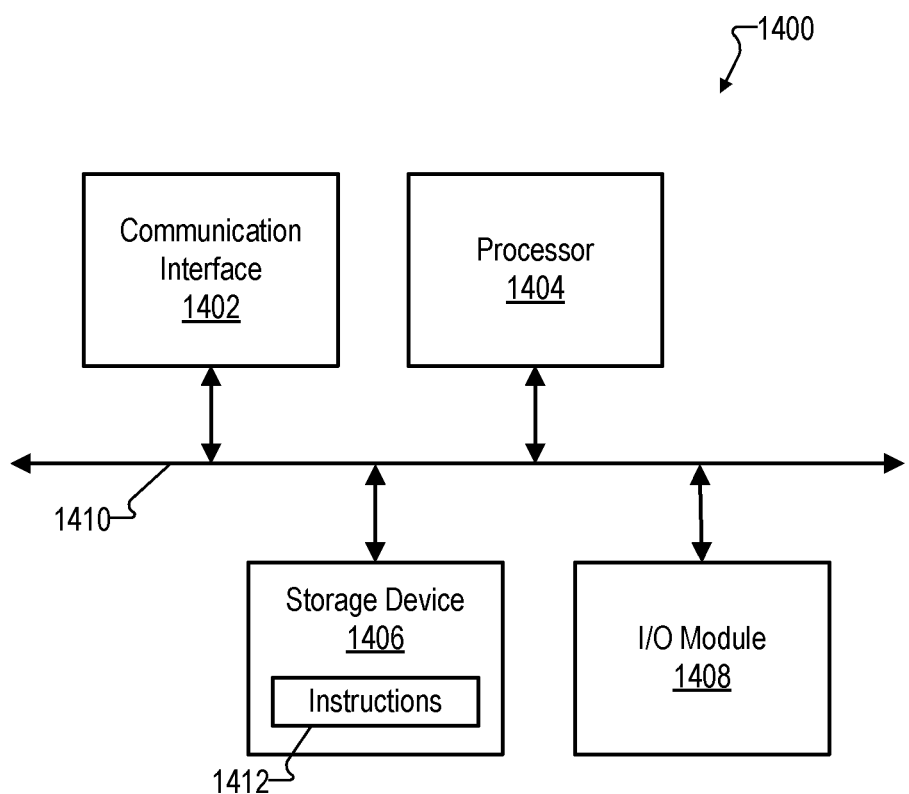
FIG. 14 illustrates an exemplary computing device according to principles described herein.

FIG. 14 illustrates an exemplary computing device 1400 that may be specifically configured to perform one or more of the processes described herein. As shown in FIG. 14, computing device 1400 may include a communication interface 1402, a processor 1404, a storage device 1406, and an input/output (I/O) module 1408 communicatively connected one to another via a communication infrastructure 1410. While an exemplary computing device 1400 is shown in FIG. 14, the components illustrated in FIG. 14 are not intended to be limiting. Additional or alternative components may be used in other embodiments. Components of computing device 1400 shown in FIG. 14 will now be described in additional detail.

Communication interface 1402 may be configured to communicate with one or more computing devices. Examples of communication interface 1402 include, without limitation, a wired network interface (such as a network interface card), a wireless network interface (such as a wireless network interface card), a modem, an audio/video connection, and any other suitable interface.

Processor 1404 generally represents any type or form of processing unit capable of processing data and/or interpreting, executing, and/or directing execution of one or more of the instructions, processes, and/or operations described herein. Processor 1404 may perform operations by executing computer-executable instructions 1412 (e.g., an application, software, code, and/or other executable data instance) stored in storage device 1406.

Storage device 1406 may include one or more data storage media, devices, or configurations and may employ any type, form, and combination of data storage media and/or device. For example, storage device 1406 may include, but is not limited to, any combination of the non-volatile media and/or volatile media described herein. Electronic data, including data described herein, may be temporarily and/or permanently stored in storage device 1406. For example, data representative of computer-executable instructions 1412 configured to direct processor 1404 to perform any of the operations described herein may be stored within storage device 1406. In some examples, data may be arranged in one or more location databases residing within storage device 1406.

I/O module 1408 may include one or more I/O modules configured to receive user input and provide user output. One or more I/O modules may be used to receive input for a virtual experience. I/O module 1408 may include any hardware, firmware, software, or combination thereof supportive of input and output capabilities. For example, I/O module 1408 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1408 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 1400. For example, memory 102 may be implemented by storage device 1406, and processor 104 may be implemented by processor 1404.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:
1. A system comprising:
 a memory that stores instructions; and
 a processor communicatively coupled to the memory and configured to execute the instructions to:
  direct a user of a computing device to capture image scan information by moving an imaging device in a predefined direction in relation to a scene until a mean pixel parallax associated with the image scan information is above a predefined threshold;
  access the image scan information of a scene captured by the imaging device of the computing device;
  generate, based on the image scan information, depth data associated with one or more objects in the scene;
  provide a two-dimensional (2D) annotation grid for concurrent display together with an image of the scene, at least part of the 2D annotation grid mapped to the depth data;
  receive a user input that selects a portion of the 2D annotation grid and a corresponding position within the scene where a digital object will be anchored based on the depth data; and instruct the computing device to display, by way of a display device of the computing device and based on the user input, the digital object anchored at the corresponding position within the scene.

2. The system of claim 1, wherein the image of the scene is a still image of the scene.

3. The system of claim 1, wherein the predefined direction is a horizontal direction in relation to the scene.

4. The system of claim 1, wherein the generating of the depth data includes generating a point cloud for the scene based on the image scan information.

5. The system of claim 1, wherein:
the 2D annotation grid includes a plurality of cells; and
the user input that selects the portion of the 2D annotation grid selects one or more cells included in the plurality of cells.

6. The system of claim 5, wherein a first subset of cells included in the plurality of cells is mapped to the depth data and a second subset of cells included in the plurality of cells is not mapped to the depth data.

7. The system of claim 6, wherein the 2D annotation grid includes a visual indicator that visually differentiates the first subset of cells from the second subset of cells.

8. The system of claim 1, wherein:
the 2D annotation grid and the image are provided for concurrent display by way of the display device of the computing device to the user of the computing device; and
the user input is provided by the user of the computing device.

9. The system of claim 8, wherein the receiving of the user input comprises:
capturing imagery of a hand of the user of the computing device;
determining, based on the imagery of the hand of the user of the computing device, a hand gesture performed by the user of the computing device; and
determining the user input based on the hand gesture.

10. The system of claim 1, wherein:
the 2D annotation grid and the image are provided for concurrent display by way of an additional display device of an additional computing device located remotely from the scene and the computing device; and
the user input is provided by a user of the additional computing device.

11. The system of claim 1, wherein the digital object is a predefined digital object that is moved into position within the 2D annotation grid based on the user input.

12. The system of claim 1, wherein the digital object is drawn by a user with respect to the 2D annotation grid.

13. A computing device comprising:
a display device;
a memory that stores instructions; and
a processor communicatively coupled to the memory and configured to execute the instructions to:
direct a user of a remote computing device to capture image scan information by moving an imaging device in a predefined direction in relation to a scene until a mean pixel parallax associated with the image scan information is above a predefined threshold;
receive, from the remote computing device, the image scan information of the scene captured by the imaging device of the remote computing device;
generate, based on the image scan information, depth data associated with one or more objects in the scene;
provide, for display by way of the display device, a two-dimensional (2D) annotation grid concurrently together with an image of the scene, at least part of the 2D annotation grid mapped to the depth data;
detect a user input that is provided by a user of the computing device and that selects a portion of the 2D annotation grid and a corresponding position within the scene where a digital object will be anchored based on the depth data; and
instruct the remote computing device to display, by way of a display device of the remote computing device and based on the user input, the digital object anchored at the corresponding position within the scene to guide a user of the remote computing device in interacting with respect to the scene.

14. The computing device of claim 13, wherein:
the 2D annotation grid includes a plurality of cells; and
the user input that selects the portion of the 2D annotation grid selects one or more cells included in the plurality of cells.

15. The computing device of claim 14, wherein a first subset of cells included in the plurality of cells is mapped to the depth data and a second subset of cells included in the plurality of cells is not mapped to the depth data.

16. A method comprising:
directing, by a scene annotation system, a user of a computing device to capture image scan information by moving an imaging device in a predefined direction in relation to a scene until a mean pixel parallax associated with the image scan information is above a predefined threshold;
accessing, by the scene annotation system, image scan information of the scene captured by the imaging device of the computing device;
generating, by the scene annotation system and based on the image scan information, depth data associated with one or more objects in the scene;
providing, by the scene annotation system, a two-dimensional (2D) annotation grid for concurrent display together with an image of the scene, at least part of the 2D annotation grid mapped to the depth data;
receiving, by the scene annotation system, a user input that selects a portion of the 2D annotation grid and a corresponding position within the scene where a digital object will be anchored based on the depth data; and
instructing, by the scene annotation system, the computing device to display, by way of a display device of the computing device and based on the user input, the digital object anchored at the corresponding position within the scene.

17. The method of claim 16, wherein the generating of the depth data includes generating a point cloud of the scene based on the image scan information.

18. The method of claim 16, wherein the image of the scene is a still image of the scene.

19. The method of claim 16, wherein:
the 2D annotation grid includes a plurality of cells; and
the user input that selects the portion of the 2D annotation grid selects one or more cells included in the plurality of cells.

20. The method of claim 19, wherein a first subset of cells included in the plurality of cells is mapped to the depth data and a second subset of cells included in the plurality of cells is not mapped to the depth data.

* * * * *